Oct. 28, 1958 L. H. ROWLEY ET AL 2,858,503
MAGNETIC AMPLIFIER CIRCUIT
Filed Aug. 19, 1954

United States Patent Office

2,858,503
Patented Oct. 28, 1958

2,858,503

MAGNETIC AMPLIFIER CIRCUIT

Lothair H. Rowley, Syosset, and John L. Hennessy, Jr., New York, N. Y., assignors to Sperry Rand Corporation, a corporation of Delaware Application August 19, 1954, Serial No. 450,925

6 Claims. (Cl. 323—89)

This invention relates to a magnetic amplifier circuit which employs a two stage load control network comprising respective pairs of saturable core reactors by means of which the signal controlled impedances in the first stage are employed to precondition the reactor cores in the succeeding stage. The load current in the third stage is controlled by the impedance of the second stage reactors.

The signal directly controls the core impedances in only the first stage. Points situated between the cores in the two stages are at the same potential. A change in core impedance in the first stage therefore results in corresponding voltage changes in the control coils of the second stage. The consequent change of current values in the second stage affects the load core impedances serving to precondition them for the load half-cycle of the line current.

The input stage circuit branches in the system are poled in one direction while the load circuit is poled in the opposite direction. Resistors are placed either in the branches or as shunts for the poling devices to compensate for differences that may appear in them. This insures that the currents in the bias windings in the two halves of the second stage are equal except on signal.

The invention provides a modified circuit to operate and control the load on full wave rectified current. This is achieved by oppositely poling the rectifiers in each circuit with corresponding devices being poled oppositely in the two biasing branch circuits.

Figure 1:
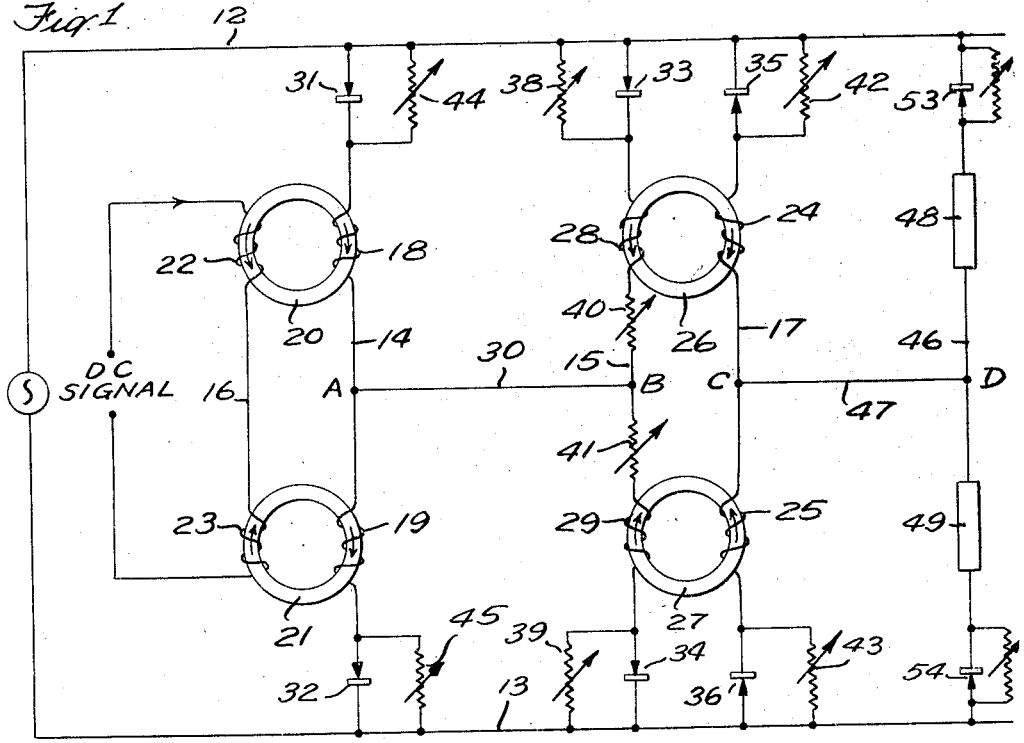
Figure 2:
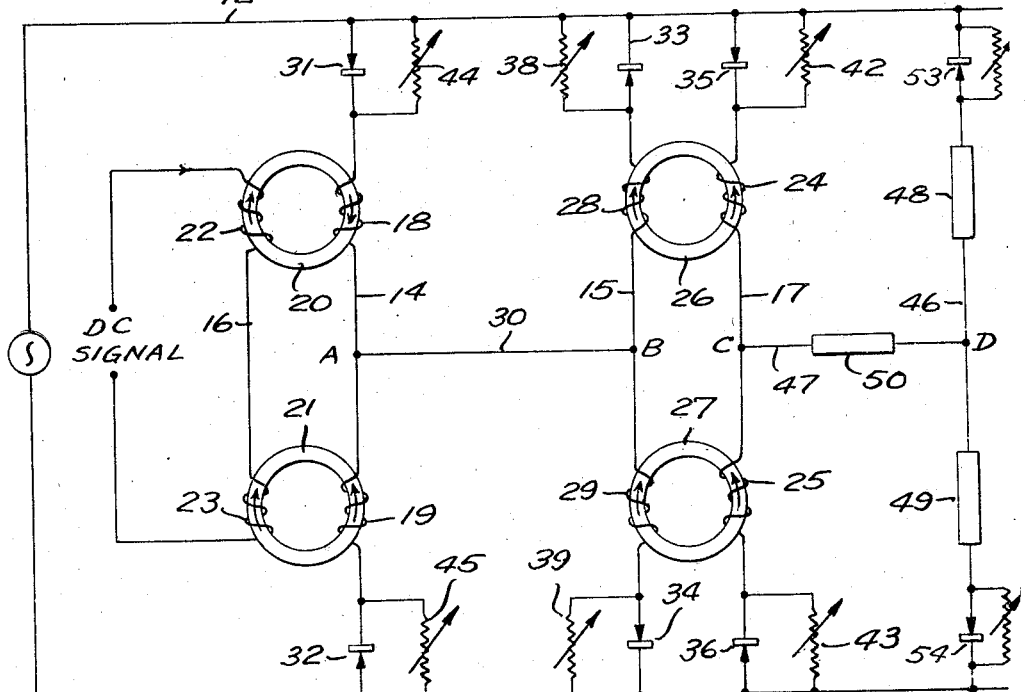

The invention will be further explained in connection with the embodiments illustrated in the accompanying drawing, in which:

Fig. 1 is a diagram of a magnetic amplifier circuit with biasing means in embodiment of the invention; and Fig. 2 is a modified circuit arrangement showing the operation and control of the load for full wave rectified current.

In Fig. 1 is shown a bridge type of core reactor circuit wherein the sides of the bridge network comprehend separate stages with the signal control current operating exclusively in the first stage and the load being controlled solely from the second stage.

The source of A.-C. current is connected to the lines 12 and 13 across which are connected two branch reactor circuits 14 and 15 in parallel. Four separate ring cores provide two separate closed magnetic paths for each branch circuit. The signal control circuit 16 has a push-pull effect on the two cores for the first branch circuit 14. A load circuit 17 is inductively disposed on the two cores of the second branch circuit 15. The branch circuits being connected at some point between the lines, the circuit 15 is in effect the control circuit for the load circuit 17 and the currents in the latter are responsive to the signal.

More specifically a load winding 18 is connected in branch circuit 14 to reactor winding 19. The windings are inductively related to cores 20 and 21 respectively. As shown the windings the wound to induce flux in the same direction in the cores. The signal control circuit 16 includes control windings 22 and 23 on cores 20 and 21 respectively and are arranged in push-pull relation to the magnetic flux induced by the load windings on the respective cores. Similarly load circuit 17 has two windings 24 and 25 wound on cores 26 and 27 and branch circuit 15 also has windings 28 and 29 which serve the double purpose of control and bias windings wound on the same cores respectively.

Lead 30 connects the two branch circuits at points A and B which are preferably located at half-line voltage on zero signal. When the voltages above and below points A and B in the two branches are equal, the currents in coils 18 and 19 are equal and the currents in coils 28 and 29 are equal, with no current through lead 30. It is apparent, however, that a signal produces a voltage difference in the windings 28 and 29 which are the control windings for their respective cores. A voltage difference on windings 28 and 29 produces differential currents therein which in turn cause a difference in core impedances for the load half-cycle. Accordingly the potentials across load windings 24 and 25 are responsive to the signal.

The two branch circuits are similarly poled by rectifiers 31 and 32 in circuit 14 and rectifiers 33 and 34 in circuit 15. Rectifiers 35 and 36 are provided in load circuit 17. The rectifiers in the branch and load circuits are oppositely poled in order that the biasing and load circuits will be alternately pulsed and the cores 26 and 27 preconditioned. Rectifiers on the same side of the points of connection in the branch circuits and load circuits (hereinafter described) have the same polarity.

Since the impedances in the cores of the second branch circuit 15 are controlled by the currents in the respective halves of that circuit, it is necessary to adjust for any differences in voltage drop that may appear in rectifiers 33 and 34. Resistances 38 and 39 are provided in shunt of the rectifiers for that purpose. Resistors 40, 41, 42 and 43 are provided in the second branch and load circuits respectively for adjusting the bias on cores 26 and 27 to the desired operating point. Shunt resistors 44 and 45 perform the same function for cores 20 and 21 in the first branch circuit 14. Resistors 40 and 41 serve the additional purpose of limiting the current in coils 28 and 29 to a safe value and for adjusting so that no current flows in the lead 30 on zero signal.

A load circuit 46 may be placed across the alternating current line in parallel with the load circuit 17. A lead 47 is provided to connect the two load branches at points C and D of half-line voltage on zero signal. A load 48 and 49 and rectifiers 53 and 54 poled similarly to rectifiers 35 and 36 may be placed in the load circuit 46 on both sides of the connection of lead 47 and the load circuit. A third load (not shown) may be placed in lead 47 if desired. The load 48 and 49 may be control windings for a conventional bridge or differentially connected motor windings.

It is thus seen that a change in core impedance in cores 26 and 27 results in a change in current in load 48 and 49. Specifically a D.-C. signal applied to the signal circuit 16 in the direction indicated by the arrows produces an increase in current in control coil 28 and decreases the current in control coil 29. The resulting changes in core impedance produces an increased voltage drop across reactor 25 and load 49. Correspondingly the current through load 49 is decreased and through the load 48 increased, the excess current being permitted to flow through lead 47 to the other side of the line. Of course the reverse is true when the signal current is oppositely induced, i. e., the current in load 49 increases and in load 48 decreases. It is readily seen that when the load circuit 17 is non-conducting the currents in the load 48 and 49 are equal. Preferably points C and D are located at half-line voltage so that the currents in the load 48 and 49 will be equal on the load conducting cycle providing no signal is applied.

The modification circuit shown in Fig. 2 permits full wave rectified current in a third load 50 provided in lead 47, but this load may be omitted as illustrated in Fig. 1. It is seen that the rectifiers in each circuit are poled in the opposite sense with corresponding rectifiers in the branch circuits poled oppositely as are the corresponding devices in the second branch and load circuit. The rectifiers are so directed that current is permitted to flow toward points A and C in circuits 14 and 17 respectively and away from point B in circuit 15.

In all other respects the two circuits are the same and therefore the same character references are used. If the signal is A.-C., it should be in phase with the line power.

With no input signal the voltage at point A is at half-line voltage and the current in windings 22 and 23 is zero. Thus the current in load winding 18 will be equal to the current in control winding 29. On the next half-cycle, the current in load winding 19 will be equal to that in control winding 28.

With a signal impressed on circuit 16 in the direction indicated by the arrow, the current in windings 18 and 29 will be decreased in the first half-cycle. In the other half-cycle the current in windings 19 and 28 will be increased. The impedance of cores 26 and 27 is increased and decreased respectively on each complete cycle. If the D.-C. signal is applied in the opposite direction the impedance effects are of course reversed.

The increase of the impedance of core 26 will cause a decrease in the current through the load 49. The decrease in impedance of core 27 will cause an increase in current through the load 48. If load 50 is included as shown in Fig. 2, any signal will cause a decrease in the wave rectified current flowing through it.

It is obvious that the principle of the invention is not limited with respect to the form of magnetic amplifier circuit so long as the voltages across corresponding core reactors in the branch circuits are tied by a common connection and that other modifications will occur to those skilled in the art which come within the scope of the invention as defined in the following claims:

What is claimed is:
1. A magnetic amplifier circuit comprising an A.-C. line, two pairs of closed magnetic circuits, a load winding on each of the first pair of magnetic circuits, a first branch circuit connected across the line and including the two load windings in series, a control circuit including two windings inductively disposed in push-pull relation on the respective magnetic circuits of the first pair, a control winding on each of the second pair of magnetic circuits, a second branch circuit connected across the line and including the two last mentioned control windings in series, means conductively coupling the first and second branch circuits at points between the respective magnetic circuits, a load winding on each of the second pair of magnetic circuits, a third branch circuit connected across the line and including the last mentioned load windings in series, a fourth branch circuit connected across the line, two impedance load members in series in said fourth branch circuit, and means conductively coupling the third and fourth branch circuits at points between the load windings and the load members, respectively.

2. A magnetic amplifier circuit as defined in claim 1 together with two rectifiers in each branch circuit disposed on opposite sides of the conductive coupling means connected thereto.

3. A magnetic amplifier circuit as defined in claim 2 wherein each of the rectifiers is shunted by a variable resistor.

4. A magnetic amplifier circuit as defined in claim 2 in which the rectifiers in the first and second branch circuits are similarly poled and those in the third and fourth branch circuits are poled similarly to each other and oppositely to those in the first and second branch circuits.

5. A magnetic amplifier circuit as defined in claim 2 in which the two rectifiers in each branch circuit are oppositely poled and those in the first branch circuit are poled similarly to those in the third branch circuit and those in the second branch circuit are poled similarly to those in the fourth branch circuit and oppositely to those in the first and third branch circuits.

6. A magnetic amplifier circuit as defined in claim 3 together with two series resistors in the second branch circuit, one on each side of the said conductive coupling and at least one of said resistors being variable.

References Cited in the file of this patent
UNITED STATES PATENTS 2,632,145    Sikorra _____ Mar. 17, 1953
2,683,843    Geyger _____ July 13, 1954